United States Patent [19]
Matsuoka

[11] Patent Number: 5,188,795
[45] Date of Patent: Feb. 23, 1993

[54] METALLIC VAPOR CONDENSER CAPABLE OF CIRCULATING A LIQUID METAL

[75] Inventor: Toshio Matsuoka, Ehime, Japan

[73] Assignee: Sumitomo Heavy Industries, Ltd., Tokyo, Japan

[21] Appl. No.: 673,302

[22] Filed: Mar. 22, 1991

[30] Foreign Application Priority Data

Aug. 30, 1990 [JP] Japan .................................. 2-226637

[51] Int. Cl.$^5$ .......................................... C22B 19/30
[52] U.S. Cl. .................................. 266/202; 266/200; 266/229; 266/242
[58] Field of Search ............... 266/200, 202, 205, 229, 266/242; 75/665, 666, 658, 659, 663, 669, 694

[56] References Cited

U.S. PATENT DOCUMENTS

| | | | |
|---|---|---|---|
| 2,061,251 | 11/1936 | Perkins | 75/665 |
| 2,473,304 | 6/1949 | Robson | 75/666 |
| 4,687,513 | 8/1987 | Santén et al. | 75/665 |
| 4,707,333 | 11/1987 | Gardiner et al. | 266/200 |

FOREIGN PATENT DOCUMENTS 974319 2/1951 France .
993276 5/1923 Switzerland .
620644 3/1949 United Kingdom .

Primary Examiner—Scott Kastler
Attorney, Agent, or Firm—Burns, Doane, Swecker & Mathis

[57] ABSTRACT

In a metallic vapor condenser for use in recovering, in the form of liquid metal, metallic vapor of a metal having a medium boiling point, the liquid metal of the molten metal is sent from a splash chamber to be circulated through a skimming sump, a cooling sump, and a casting bath to the splash chamber. The liquid metal is always refreshed by circulation in the casting bath to avoid solidification of the metal. A subsidiary chamber may be coupled to the splash chamber to reverve the liquid metal to decrease dust and dross floating on the liquid metal.

11 Claims, 3 Drawing Sheets

METALLIC VAPOR CONDENSER CAPABLE OF CIRCULATING A LIQUID METAL

BACKGROUND OF THE INVENTION

This invention relates to a metallic vapor condenser for use in recovering, in the form of molten metal, a metal which has a medium boiling point between a high and a low boiling points and which may be, for example, zinc (Zn), cadmium (Cd), lead (Pb), or the like.

In general, a metal, such as zinc, cadmium, lead, is used in a dry battery and the like in large quantities. As well known, such a metal has a medium boiling point between 600° C. and 2000° C. and may be referred to as a medium boiling point metal. Heretofore, it is a recent trend that the metal is recovered to recycle or reuse the metal. For this purpose, a method is adopted such that vapor of the medium boiling point metal is quickly cooled or quenched to be recovered as molten metal. More particularly, the medium boiling point metal is once reduced and vaporized to be thereafter absorbed and condensed in a metal bath formed by the same metal by the use of a pyro-metallurgical refining technique. As a result, the metal is recovered in the form of molten metal.

Herein, it is to be noted that vapor of the medium boiling point metal tends to be easily reoxidized even in a high reducing atmosphere. In order to avoid such reoxidization of the molten metal, a shock chilling method has been practically enforced and has been classified into first and second methods as mentioned hereinunder.

According to the first method, the vapor of the medium boiling point metal is introduced into a condenser together with a reducing gas of, for example, CO with the vapor kept at a partial pressure and a temperature at which no oxidation of such metal vapor takes place. The vapor is thereafter brought into contact with a metal bath kept at a temperature which is slightly higher than a freezing point of the metal.

The metal vapor is introduced into a metal bath in such a method wherein the metal vapor is dispersed into the liquid metal bath by means of a submerged nozzle or an opening to form vapor bubbles in the bath (bubbler type).

In the second method, a condenser is used which comprises a splash chamber, a liquation sump, and a casting bath. Specifically, a metal bath is mechanically agitated within the splash chamber to cause splashes of metal liquid droplets to occur. In this situation, metallic vapor of metal of the medium boiling point is captured in the splash chamber which is being quickly brought into contact with the liquid metal. Consequently, the metallic vapor is condensed into the metal bath in the form of molten metal. Subsequently, the molten metal is cooled and is fed to the skimming sump to remove dross and dust which may be called impurities. The molten metal is further introduced into the liquation sump so as to separate impurities, such as a hard metal, which is an iron alloy. After removal of the dross and dust, the molten metal is reserved in the casting bath.

Inasmuch as the molten metal is finally reserved in the casting bath in the second method, it often happens that the molten metal is solidified before it is taken out from the casting bath to be cast into an ingot in the case where the condenser is small in size and the heat loss thereof is relatively high.

More specifically, if the second method is used for processing used dry batteries and/or dust, a quantity of recovery of the medium boiling point metal may be comparatively as small as 60 kg/hour and a comparatively large amount of dross takes place. Under the circumstances, application of the second method to such processing results in an excessive increase of a thermal loss.

SUMMARY OF THE INVENTION

It is an object of this invention to provide a metallic vapor condenser which is small in thermal loss.

It is another object of this invention to provide a metallic vapor condenser of the type described, which is capable of readily removing dust and dross, which occurs in a splash chamber.

It is still another object of this invention to provide a metallic vapor condenser of the type described, wherein molten metal is not easily solidified which is captured or absorbed in a metal bath.

A metallic vapor condenser to which this invention is applicable is for use in recovering metallic vapor of a predetermined metal in the form of a liquid metal. The metallic vapor condenser comprises a splash chamber into which the metallic vapor is introduced and caught in droplets generated by mechanically agitating a metal bath, to bring the metallic vapor into vapor-liquid contact with the liquid metal, and to absorb and condense the metallic vapor into the metal bath in the form of the molten metal accompanied by dust and dross, a skimming sump which communicates with the splash chamber through a first communicating conduit to move the liquid metal from the splash chamber to the skimming sump and to remove the dust and dross from the liquid metal moved to the skimming sump, a cooling sump which communicates with the skimming sump through a second communicating conduit and into which the liquid metal is introduced from the skimming sump with the dust and dross removed, to cool the liquid metal and to remove an impurity, such as a hard metal, having a specific gravity heavier than the liquid metal, a casting bath which communicates with the cooling sump through a third communicating conduit and with the splash chamber through a fourth communicating conduit. The casting bath functions as a reservoir from which a part of the liquid metal supplied from the cooling sump is ladled out as a product. The remainder of the liquid metal in the casting bath returns into the splash chamber through the fourth communicating conduit.

DESCRIPTION OF THE PREFERRED EMBODIMENT

Figure 1:
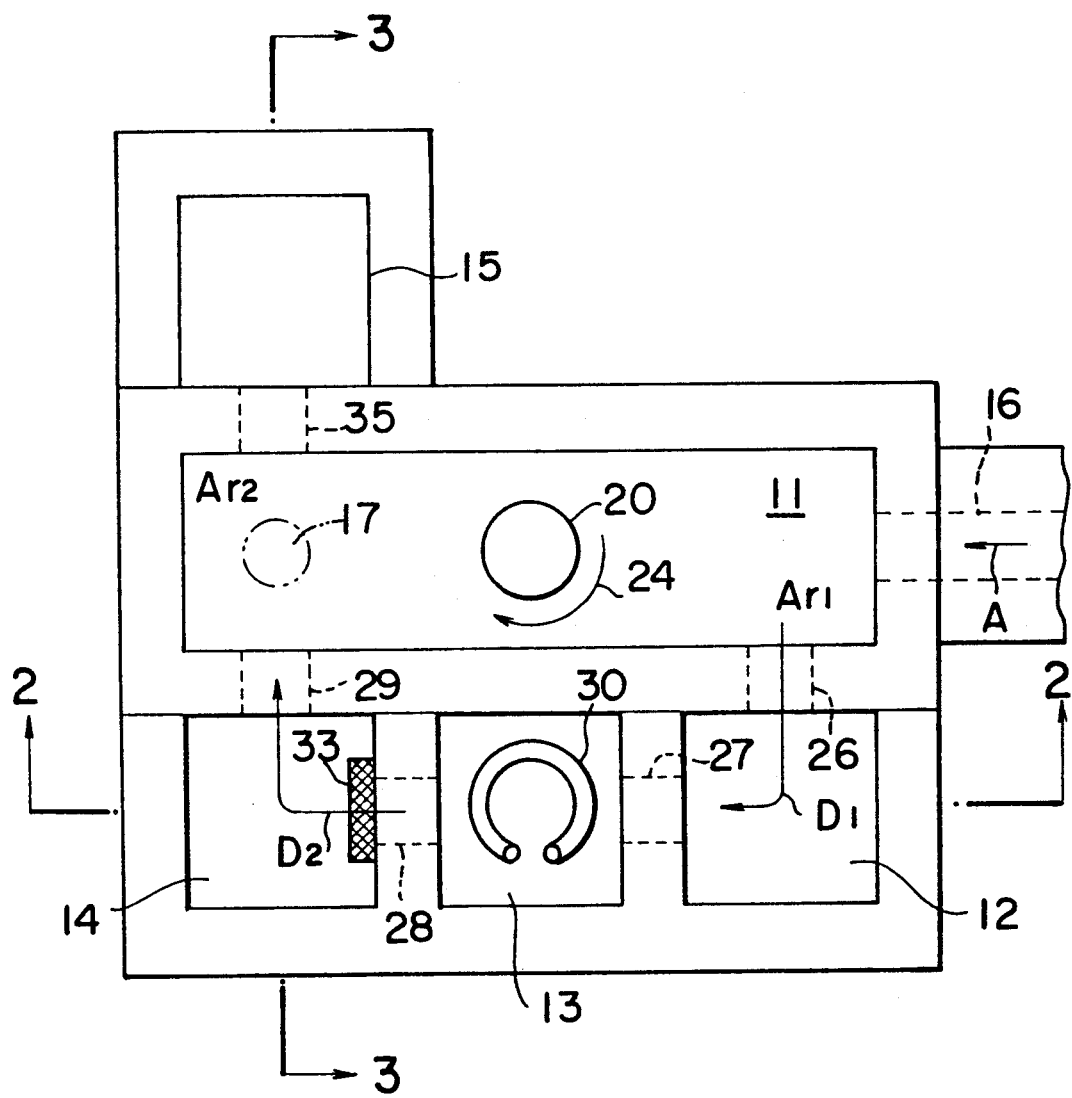
FIG. 1 shows a schematic plan view of a metallic vapor condenser according to a preferred embodiment of this invention.
Figure 2:
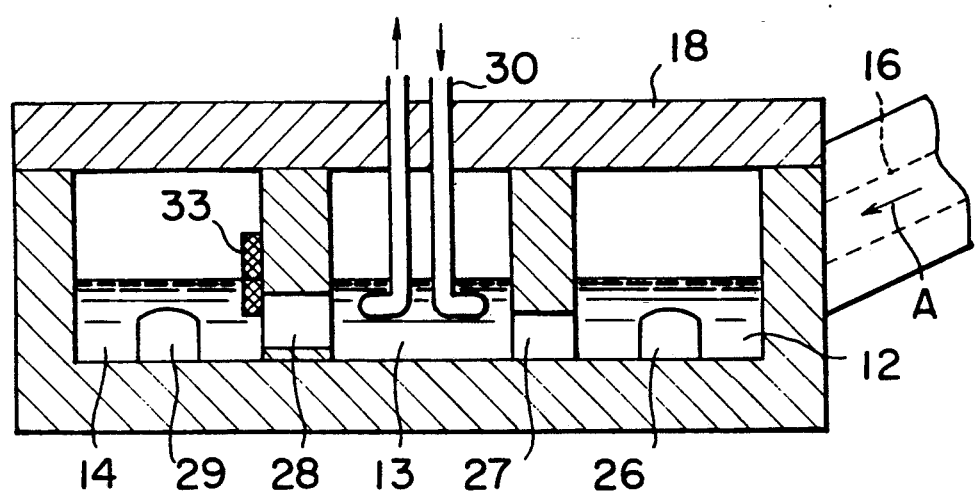
FIG. 2 is a sectional view taken along a line 2—2 shown in FIG. 1.
Figure 3:
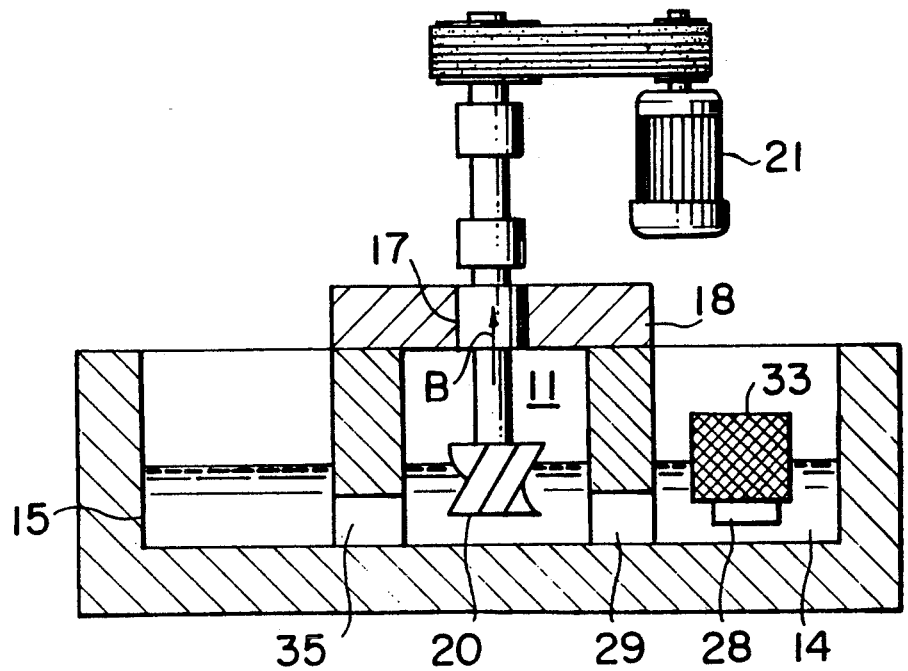
FIG. 3 is another sectional view taken along a line 3—3 shown in FIG. 1.

Referring to FIGS. 1 through 3, a metallic vapor condenser according to a preferred embodiment of this invention is preferably used as a condenser processing a zinc containing dust which is generated in an electric arc furnace for steel production or a condenser processing used dry batteries. The illustrated condenser is capable of recovering, in the form of molten metal, a metal, such as zinc, lead, cadmium, having a medium boiling point lower than 2000° C. by condensing a medium boiling point metal vapor. As illustrated in FIG. 1, the metallic vapor condenser comprises a splash chamber 11, a skimming sump 12, a cooling sump 13, a casting bath 14, and a subsidiary chamber 15 all of which communicate with one another in a manner to be described later in detail. In FIGS. 1 through 3, each of the splash chamber 11, the skimming sump 12, the cooling sump 13, the casting bath 14, and the subsidiary chamber 15 has a bottom and a wall which stands upright.

As shown in FIGS. 1 and 2, the splash chamber 11 has a gas inlet 16 attached to a righthand side end of the illustrated splash chamber 11 in FIGS. 1 and 2 and a cover plate 18. Through the gas inlet 16, a medium boiling point metal vapor is introduced together with a reducing gas, such as CO, into the splash chamber 11 in the direction as shown by an arrow A. The reducing gas is discharged from a gas outlet 17 attached to a lefthand upper portion of the cover plate 18, in the direction as shown by an arrow B in FIG. 3. In a center portion of the splash chamber 11, a rotor 20 is positioned and is mechanically coupled to a motor 21, as illustrated in FIG. 3. In the example being illustrated, let the rotor 20 be rotated by the motor 21 clockwise, as depicted at an arrow 24 in FIG. 1.

Herein, a metal bath reserved in the splash chamber 11 as illustrated in FIG. 3 is brought into contact with the rotor 20. Agitation of the metal bath causes splashes of liquid metal droplets to occur in the splash chamber 11. In addition, the metal bath is formed by liquid metal of a medium boiling point metal. In this situation, when the rotor 20 is rotated, the metal bath is agitated to cause a flow to occur in the metal bath in a rotation direction of the rotor. As a result, the medium boiling point metal vapor is brought into contact with the droplets and is absorbed and condensed as the molten metal in the metal bath held in the splash chamber 11. The above-mentioned contact may be called vapor-liquid contact.

In this event, it is to be noted that the medium boiling point metal vapor may often include dust introduced from the gas inlet 17 and may not completely be condensed with dross formed in the splash chamber 11. Consequently, the dross and dust may float on a surface of the metal bath because the dross and dust is generally light in weight as compared with the medium boiling point metal. Under the circumstances, when the rotor is rotated clockwise, as shown in FIG. 1, the dross and dust tends to be gathered at specific areas of the splash chamber 11, i.e., the areas adjacent to corners of the splash chamber 11 which are depicted at Ar1 and Ar2 when the rotor 20 is rotated clockwise.

Taking the above into consideration, the splash chamber 11 communicates with the skimming sump 12 through a first communicating conduit 26 which is shown by a broken line in FIG. 1 and which is attached to the portion adjacent to the specific area Ar1. Specifically, the first communicating conduit 26 has a bottom flush with the bottoms of the splash chamber 11 and the skimming sump 12.

When the rotor 20 is rotated, the liquid metal is forced to be sent to the skimming sump 12 along a direction indicated at D1 in FIG. 1. Thus, a flow of the liquid metal is introduced from the splash chamber 11 to the skimming sump 12 through the first communicating conduit 26, together with the dust and dross floating on the liquid metal. In the skimming sump 12, the dust and dross is skimmed from the liquid metal in a known manner to be removed therefrom. In any event, a metal bath is left in the skimming sump 12 with the dust and dross mostly removed.

The skimming sump 12 communicates with a cooling sump 13 through a second communicating conduit 27. A bottom of the second communicating conduit 27 is flush with the bottoms of the skimming and the cooling sumps 12 and 13.

In the cooling sump 13, a cooling pipe 30 is submerged and is brought into contact with the metal bath in the cooling sump 13. Cooling water flowing in the cooling pipe 30 cools the metal bath in the cooling sump 13.

Herein, let a main component of molten metal in the metal bath be zinc (Zn). In this case, the metal bath is kept at a temperature of about 500° C. As well known, the specific gravity of zinc is smaller than the hard metal, i.e., $FeZn_{14}$. Such a hard metal is included in the metal bath as impurities. The impurities, such as an alloy between iron and the medium boiling point metal which is heavier in the specific gravity than the liquid metal, are precipitated on the bottom of the cooling sump 13 and can be removed from the metal bath in the cooling sump 13.

The cooling sump 13 communicates with the casting bath 14 through a third communicating conduit 28. A bottom of the third communicating conduit 28 is higher than the bottom of the cooling sump 13, as illustrated in FIG. 2. Therefore, such a precipitate is not drifted from the cooling sump 13 to the casting bath 14. Thus, the cooling sump 13 also serves as a liquation bath. At any rate, the metal bath or liquid metal from which the impurities are removed is supplied from the cooling sump 13 to the casting bath 14 through the third communicating conduit 28. As a result, the casting bath 14 reserves the liquid metal which is fed from the cooling sump 13 and which is freed of the impurities. Thus, molten metal freed of the impurities is accommodated in the casting bath 14 and used as a product.

The casting bath 14 communicates with the splash chamber 11 through a fourth communicating conduit 29. As shown in FIG. 2, a bottom of the fourth communicating conduit 29 is flush with the bottom of the casting bath 14 and the splash chamber 11. Thus, the liquid metal is circulated into the splash chamber 11 through the fourth communicating conduit 29, as depicted at an arrow D2. In addition, a flow rate control valve or gate 33 is placed in the casting bath 14 to control a degree of opening of the third communicating conduit 28. As a result, an amount of circulation of the liquid metal is controlled by the flow rate control valve 33. Such circulation of the liquid metal is helpful for mixing the liquid metal with each other and for making a temperature of the liquid metal substantially uniform.

With this structure mentioned above, it is possible to keep a temperature of the liquid metal substantially uniform in each chamber and to prevent the molten metal from being solidified in each chamber because the liquid metal is partially always circulated from the splash chamber 11 and fed back to the splash chamber 11, as mentioned above.

In FIGS. 1 and 3, the splash chamber 11 communicates with the subsidiary chamber 15 through a fifth communicating conduit 35 which has a bottom flush with the bottoms of the splash and the subsidiary chambers 11 and 15, as shown in FIG. 3. It is to be noted that the fifth communicating conduit 35 is located at a portion adjacent to the specific area Ar2 of the splash chamber 11. Inasmuch as the dust and dross is gathered at the specific area Ar2 and floats on the metal bath, as mentioned before, the dust and dross is forcibly sent to the subsidiary chamber 15 through the fifth communicating conduit 35 and floats on the metal bath in the subsidiary chamber 15, like in the same manner as the skimming sump 12.

As mentioned above, the molten metal or the liquid metal is always circulated from the splash chamber 11 through the skimming sump 12, the cooling sump 13, and the casting bath 14 and fed back to the splash chamber 11. This means that the metal bath is always refreshed in the casting bath and is therefore never oxidized therein. Besides, the dust and dross is successively decreased with time because it is sent to the subsidiary chamber 15.

Figure 4:
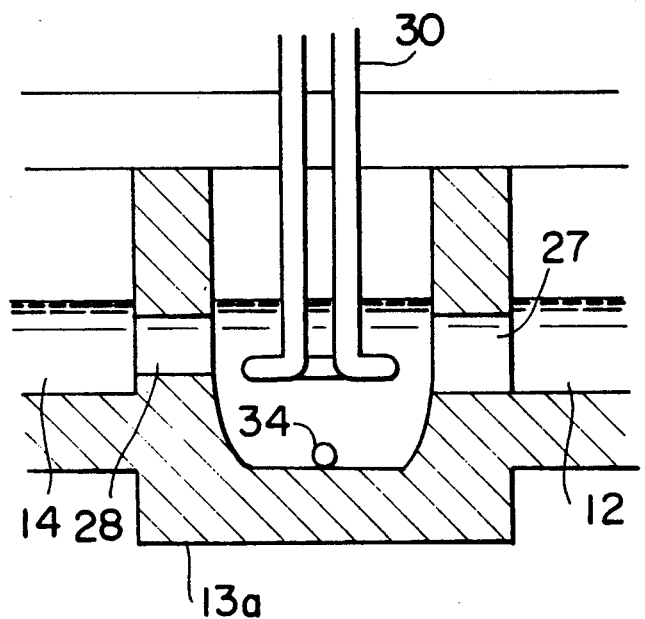
FIG. 4 is a sectional view of a modification of a cooling sump which is applicable to the metallic vapor condenser illustrated in FIGS. 1 through 3.

Referring to FIG. 4, a cooling sump 13a is applicable to the metallic vapor condenser illustrated in FIG. 1, instead of the cooling sump 13 shown in FIG. 1. The illustrated cooling sump 13a has a bottom lower than both the bottoms of the skimming sump 12 and the casting bath 14. In other words, the cooling sump 13a has a depth deeper than the skimming sump 12 and the casting bath 14. In addition, a drain hole 34 is placed on the bottom of the cooling sump 13a so that all the liquid metal can be drained out in the case where the condenser is shut down or the like.

Thus, a loop is formed through the splash chamber 11, the skimming sump 12, the cooling sump 13, and the casting bath 14 to circulate the liquid metal and to always refresh the liquid metal in each sump, bath, or chamber. Therefore, the temperature of the liquid metal can be kept substantially uniform in each chamber and a flow of refreshed liquid metal serves to avoid solidification of the liquid metal. Moreover, the dust and dross can be removed during the circulation of the liquid metal.

While this invention has thus far been described in conjunction with a preferred embodiment thereof, it will readily be possible for those skilled in the art to put this invention into practice in various other manners. For example, the subsidiary chamber 15 may be omitted from the condenser. In addition, the casting bath 14 may have the lowest bottom among the splash chamber 11, the skimming sump 12, the cooling sump 13, and the casting bath 14.

What is claimed is:

1. A metallic vapor condenser for use in recovering metallic vapor of a predetermined metal in the form of a liquid metal, said metallic vapor condenser comprising:
   a splash chamber responsive to said metallic vapor for accommodating a metal bath to absorb said metallic vapor into said metal bath;
   a rotor located in said splash chamber for agitating said metal bath in said splash chamber and causing a flow of the liquid metal to occur together with impurities in a rotational direction so that said impurities are gathered at predetermined areas;
   a skimming sump connected to said splash chamber at one of said predetermined areas for skimming said impurities to attain an impurity-free liquid metal;
   a cooling sump for cooling said impurity-free liquid metal to obtain a cooled liquid metal;
   a casting bath for reserving said cooled liquid metal; and
   means for circulating said cooled liquid metal to said splash chamber so that said flow of the liquid metal caused by the rotor circulates from the splash chamber to the skimming sump, from the skimming sump to the cooling sump, from the cooling sump to the casting bath and from the casting bath to the splash chamber.

2. A metallic vapor condenser as claimed in claim 1, further comprising:
   a subsidiary chamber connected to said splash chamber for reserving said liquid metal fed from said splash chamber.

3. A metallic vapor condenser for use in recovering, in the form of a liquid metal, metallic vapor of a metal having a medium boiling point, said metallic vapor condenser comprising:
   a splash chamber into which said metallic vapor is introduced and caught in droplets generated by mechanically agitating a metal bath, to bring said metallic vapor into vapor-liquid contact with said liquid metal, and to absorb and condense said metallic vapor into said metal bath in the form of said molten metal accompanied by dust and dross;
   a rotor located in said splash chamber for agitating the metal bath in said splash chamber to gather the dust and dross at predetermined areas;
   a skimming sump which communicates with said splash chamber through a first communicating conduit to move said liquid metal from said splash chamber to said skimming sump and to remove said dust and dross from said metal bath which is formed by said liquid metal moved to said skimming sump;
   a cooling sump which communicates with said skimming sump through a second communicating conduit and into which said liquid metal is introduced from said skimming sump with said dust and dross removed, to cool said liquid metal and to obtain a cooled liquid metal; and
   a casting bath which communicates with said cooling sump through a third communicating conduit and with said splash chamber through a fourth communicating conduit to reserve, as a casting molten metal, said liquid metal supplied from said cooling sump and to return said liquid metal including the casting molten metal back to said splash chamber through the fourth communicating conduit;
   the rotor causing the liquid metal to circulate from the splash chamber to the skimming sump, from the skimming sump to the cooling sump, from the cooling sump to the casting bath and from the casting bath to the splash chamber.

4. A metallic vapor condenser as claimed in claim 3, wherein said cooling sump has a bottom and a wall and connected to said splash chamber through the third communicating conduit, and wherein said third communicating conduit is connected to said cooling sump at a position higher than said bottom of the cooling sump.

5. A metallic vapor condenser as claimed in claim 3, each of said cooling sump, said skimming sump, and said casting bath having a bottom, wherein the bottom of said cooling sump is located at a position lower than each of the bottoms of said skimming sump and said casting bath.

6. A metallic vapor condenser as claimed in claim 3, further comprising a control valve which is attached to said third communicating conduit to control an aperture of the third communicating conduit.

7. A metallic vapor condenser as claimed in claim 3, wherein
said first communicating conduit is attached to a position adjacent to a selected one of said predetermined areas.

8. A metallic vapor condenser as claimed in claim 3, further comprising:
a subsidiary chamber which communicates with said splash chamber through a fifth communicating conduit for reserving said dust and dross included in said liquid metal and sent from said splash chamber through said fifth communicating conduit.

9. A metallic vapor condenser as claimed in claim 8, wherein said first and said fifth communication conduits are each attached to positions adjacent to one of said predetermined areas.

10. A metallic vapor condenser as claimed in claim 3, each of said cooling sump, said skimming sump, and said casting bath having a bottom, the bottom of the cooling sump being further provided with a drain.

11. A metallic vapor condenser as claimed in claim 5, wherein the bottom of the cooling sump is further provided with a drain.

* * * * *